(No Model.)
J. J. HARDEN.
HAND GRENADE FIRE EXTINGUISHER.
No. 297,075. Patented Apr. 15, 1884.
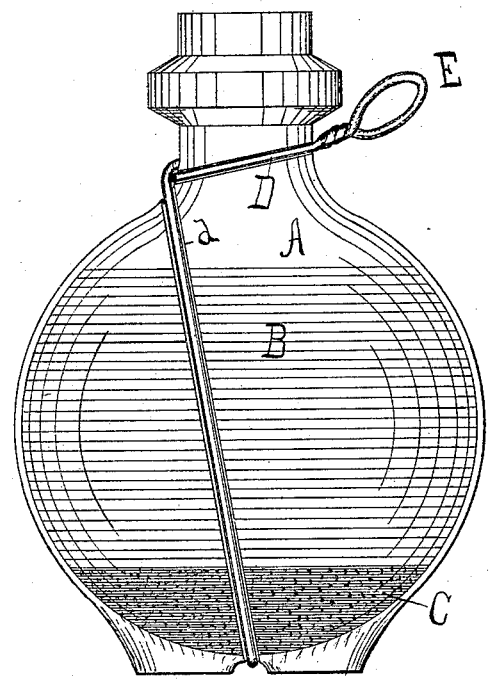
WITNESSES:
E. L. Thurston.
T. H. Hood
INVENTOR:
John J. Harden
by Hill & Dixon
Attorneys.

UNITED STATES PATENT OFFICE.

JOHN J. HARDEN, OF CHICAGO, ILLINOIS.

HAND-GRENADE FIRE-EXTINGUISHER.

SPECIFICATION forming part of Letters Patent No. 297,075, dated April 15, 1884.

Application filed August 10, 1883. (No model.)

*To all whom it may concern:*

Be it known that I, JOHN J. HARDEN, of the city of Chicago, Cook county, and State of Illinois, have invented certain new and useful Improvements in Hand-Grenade Fire-Extinguishers, of which the following is a description, reference being had to the accompanying drawing, which represents a side elevation of my improved hand-grenade fire-extinguisher.

In the manufacture of frangible hand-grenades containing, under pressure, a solution capable of extinguishing fires, it is necessary to have the walls of the grenade sufficiently strong to resist the internal pressure of the contained materials and sufficiently frangible to break when thrown against a burning substance. Practically it is found almost impossible to uniformly secure both conditions, and the consequence is that a considerable number of such grenades fail to break when thrown with the force ordinarily employed.

The object of my present improvement is to remedy such difficulty; and to that end my invention consists, first, in inclosing with the liquid contents of the frangible vessel some solid body or bodies, preferably granulated or reduced to fine particles, of a specific gravity equal to or greater than that of the liquid—such as sawdust, sand, metal chips, and the like—which particles are free to move within the liquid; and, second, the application to the exterior of the frangible glass shell of a wire or metal band or other material of greater heat-conducting power than glass.

In the drawing, which shows a side elevation of my device, A represents the frangible glass containing-shell; B, the solution containing the fire-extinguishing gases; C, the solid particles, which, by reason of their specific gravity, normally occupy the lowest position within the shell.

D represents the wire or band, and *d'* the notches or grooves in the glass, which act both to hold the wire in position and also to bring a greater portion of the glass in contact with the wire. The solid particles C should be of some material that will neither impair the efficiency of the fire-extinguishing liquid nor be destroyed by it, and upon experiment I find that quartz sand in about the proportion in bulk represented in the drawing gives the most satisfactory result, although many other substances and a greater or less amount will perform the same function, though perhaps to a less degree. I do not venture to state with confidence the exact theory of the operation of the solid particles thus introduced, as, after many successful experiments with solids of different specific gravities, I am yet undetermined whether they produce the fracture by direct impact, or by preventing the liquid from supporting the wall equally all around, or by some other undiscovered action; but the fact that their introduction with the liquid causes the grenade to break with greater certainty is fully established. The introduction of these particles also produces the further useful effect of dividing up the liquid contents when the shell is broken and spreading it over a greater burning-surface, thus causing the liquid to yield up its fire-extinguishing gases much sooner than it otherwise would, and over a greater area.

The second part of my invention, which consists, as before stated, of the combination, with the glass shell, of a wire or metal band or other substance of high conducting-power, is as follows—viz., if a grenade be thrown into a fire, and if for any reason it should fail to break, the explosion of the shell would then depend upon the expansion of the glass by reason of the heat. The wire or metal band, being of high conducting-power, would become heated before the glass, and would impart its heat to the glass at the points of contact, thereby causing an unequal expansion of the glass and consequent bursting of the shell. Any substance of high conducting-power would produce this result; but a wire is the preferable form, because it is inexpensive, easily applied, and may be twisted into a loop or hook, as shown at E in the drawing. By this hook or loop the grenade may be suspended in proximity to any inflammable material, so that in case of fire it would be subjected to the action of the heat, explode, and liberate the gases, and thus automatically extinguish the fire.

It is also desirable in constructing the glass shell to provide a groove or series of notches in which the wire is secured, because by thus bringing a greater surface of glass in contact with the wire the explosion of the shell when subjected to the action of the heat is more certain.

Having thus described my invention, what I claim as new, and desire to secure by Letters Patent, is—

1. As an improvement in hand-grenade fire-extinguishers, the combination of the frangible walls of the grenade with the contained fire-extinguishing solution, and with movable solid bodies applied within the grenade, substantially as and for the purpose herein specified.

2. In a hand-grenade fire-extinguisher, the combination of a glass shell and a wire, metal band, or other substance having a greater heat-conducting power than glass, substantially as and for the purpose herein specified.

3. In a hand-grenade fire-extinguisher, the combination of the glass shell with a wire or metal band provided with a loop or hook, substantially as and for the purpose set forth.

4. In a hand-grenade fire-extinguisher, the combination of a glass shell provided with notches, and a wire or metal band inserted in the grooves or notches, substantially as and for the purpose set forth.

JOHN J. HARDEN.

Witnesses:
E. L. THURSTON,
D. H. FLETCHER.